INVENTOR
HOWARD L. CROSWHITE
BY
ATTORNEYS

May 26, 1964    H. L. CROSWHITE    3,134,471
FLUID PRESSURE ACTUATED CLUTCH OR BRAKE
Filed June 29, 1960    2 Sheets-Sheet 2
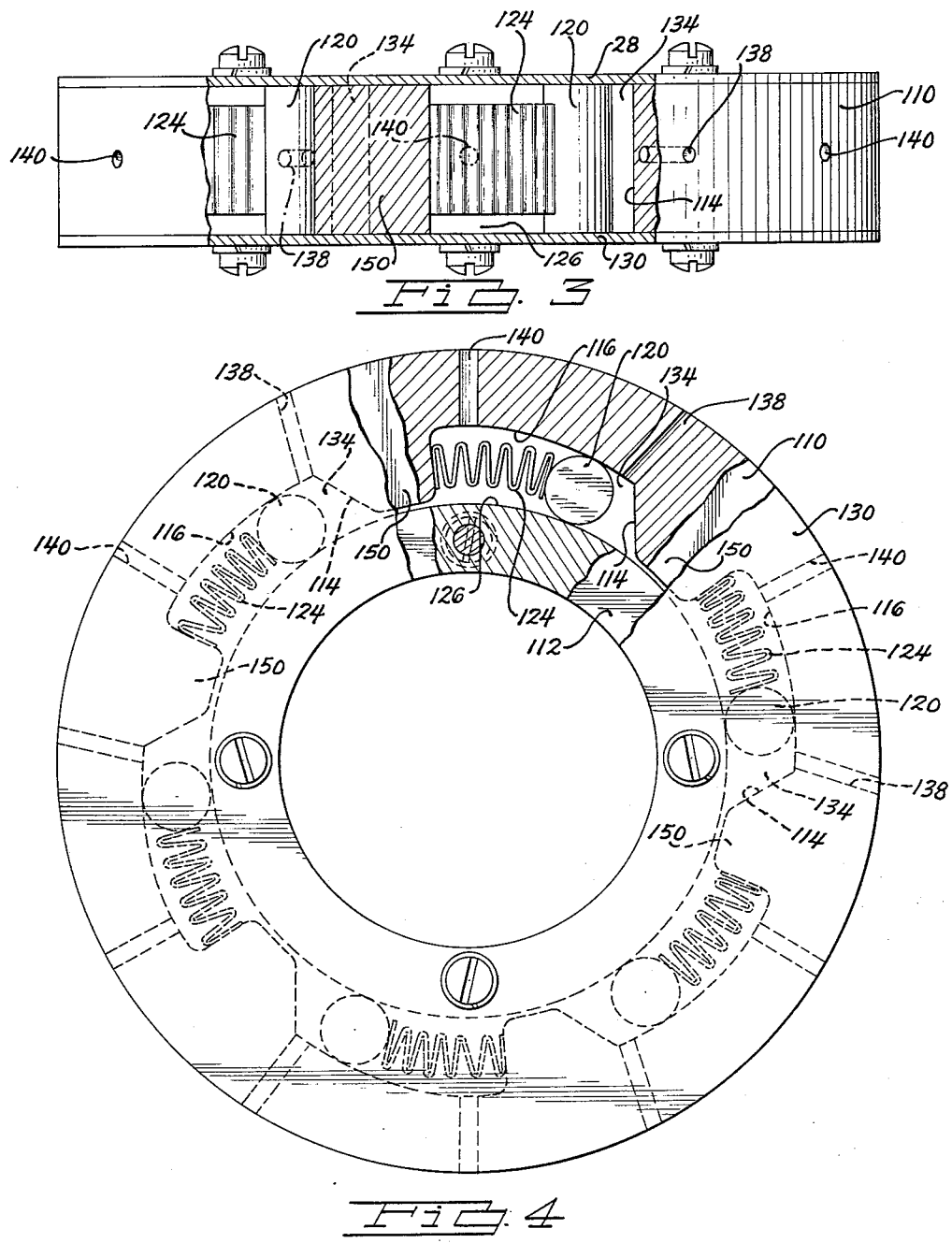
INVENTOR
HOWARD L. CROSWHITE
BY
ATTORNEYS

United States Patent Office 3,134,471
Patented May 26, 1964

3,134,471
FLUID PRESSURE ACTUATED CLUTCH
OR BRAKE
Howard L. Croswhite, Livonia, Mich., assignor to Ford
Motor Company, Dearborn, Mich., a corporation of
Delaware
Filed June 29, 1960, Ser. No. 39,701
11 Claims. (Cl. 192—44)

My invention relates generally to torque transmitting mechanisms, and more particularly to overrunning clutches or brakes in which provision is made for selectively controlling the clutching or braking action.

My improved structure is capable of being used in a geared power transmission in combination with transmission gearing for establishing a torque delivery path between the torque transmitting elements of the mechanism, or for transferring reaction torque to a relatively stationary part of the transmission mechanism. In this way the relative motion of the gear elements can be controlled, and speed ratio changes can be accomplished.

According to a principal feature of my invention I have made provision for hydraulically releasing and locking the clutch or brake structure, hereinafter called a coupling, and this releasing and locking action may take place regardless of the direction of relative motion between the relatively movable coupling parts. In one embodiment of my invention the elements used for locking purposes are in the form of rollers arranged in pairs, the rollers of each pair being disposed in a common cam recess in one of the relatively movable coupling parts. One roller of each pair will effect a locking action during a torque transfer between the relatively movable coupling parts in one direction, and the other roller of each pair will so function during a torque transfer in the opposite direction. The coupling can therefore appropriately be termed "a two-way overrunning coupling."

A second embodiment of my invention is single acting, and it functions to release the coupling rollers to effect a disengagement of the overrunning coupling. The rollers are normally urged by a spring into clutching engagement with a cooperating cam surface formed on one of the relatively movable parts of the coupling.

The provision of a coupling of the type above set forth being a principal object of my invention, it is a further object to provide an overrunning coupling wherein a plurality of roller elements is situated between cooperating annular races, each race being connected to separate relatively movable parts of a transmission mechanism. I contemplate that the rollers will cooperate with the associated coupling races to define a pressure chamber which may be selectively pressurized by means of a suitable control system. One of the coupling races may be ported appropriately to facilitate distribution of pressure to the pressure chamber. The coupling rollers and the coupling races cooperate in this fashion to define a servo structure in which the rollers form a counterpart for a servo piston. When the pressure is increased in the pressure chamber, the rollers will move out of camming engagement with the cooperating cams on the coupling races, thereby effecting a disengagement of the coupling.

It is another object of my invention to provide an overrunning coupling which is reliable in operation and which is characterized by its simplicity of construction.

For the purpose of particularly describing the improvements of my instant invention, reference will be made to the accompanying drawing in which:

FIGURE 3 is a plan view, partly in section, showing a second embodiment of our invention.

FIGURE 4 is an elevation view, partly in section, of the coupling shown in FIGURE 3.

Figures 1, 2:
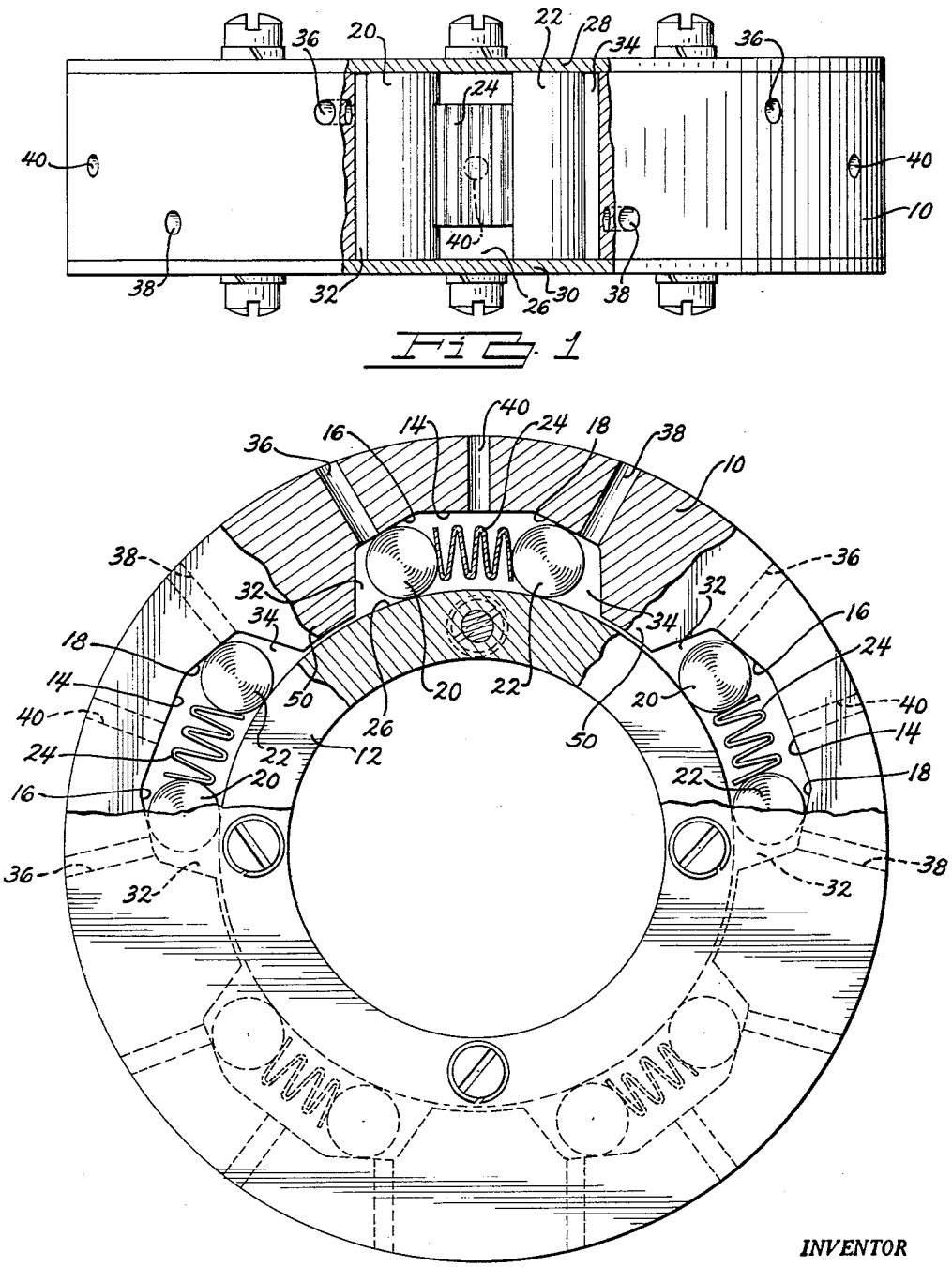
FIGURE 1 is a plan view, partly in section, showing a first embodiment of our invention.
FIGURE 2 is a side elevation view, partly in section, of the coupling shown in FIGURE 1.

Referring first to FIGURES 1 and 2, numeral 10 designates an outer coupling race and numeral 12 designates an inner coupling race. The races 10 and 12 are annular in form and they are disposed concentrically one within the other. The race 10 may be secured to one part of the power transmission mechanism, and the race 12 may be secured to a relatively movable part of the mechanism. For example, if the structure shown in FIGURES 1 and 2 is utilized as an overrunning brake, the race 10 may be secured within the transmission housing and held in a relatively fixed position. The race 12 can be splined or otherwise positively secured to a shaft that is journalled within the stationary transmission housing.

The race 10 is formed with a plurality of recesses 14, each of which define a pair of cam surfaces 16 and 18. A pair of rollers 20 and 22 is situated within each recess 14, said rollers being urged by means of springs 24 into camming engagement with cammed surfaces 16 and 18, respectively. Springs 24 may be formed with a predetermined degree of preload so that the rollers 20 and 22 are urged normally into camming engagement with their respective cam surfaces. By preference, the springs 24 are leaf springs that are convoluted in form.

The race 12 is formed with a cylindrical outer surface 26 which cooperates with the rollers 20 and 22 to establish a camming action.

A pair of side plates 28 and 30 is bolted or otherwise secured to the axial sides of the inner race 12, and they extend radially outward in overlapping engagement relationship with respect to the race 10. The plates 28 and 30 cooperate with the recess 14 to define a closed chamber. The rollers 20 and 22 are formed with flat ends that are capable of establishing a sealing relationship with respect to the adjacent surfaces of the plates 28 and 30. The rollers 20 and 22 therefore divide the recess 14 into three different chambers, the chamber between the rollers being occupied by spring 24. The chamber on the left-hand side of roller 20, as viewed in FIGURE 2, is identified by reference character 32 and the corresponding chamber on the right-hand side of roller 22 is identified by reference character 34. Chamber 32 is in fluid communication with a pressure distributor passage 36, and a corresponding passage for chamber 34 is shown at 38. The chamber occupied by spring 24 is vented to the exhaust region through a passage 40.

If it is assumed for purposes of the present description that the structure shown in FIGURES 1 and 2 functions as a brake, the stationary housing within which race 10 is situated can be suitably ported in order to accommodate distribution of fluid pressure from the fluid pressure source, such as an engine driven pump, to the passages 36 and 38. When passage 36 is pressurized, roller 22 will be moved out of camming engagement with cam surface 16, and a flow of fluid will take place about the periphery of roller 20. This flow is then exhausted through exhaust port 40 to the exhaust region.

Relative rotation of the coupling race 12 can take place under these conditions in a counterclockwise direction in FIGURE 2. When passage 36 and the communicating chamber 32 are vented, the spring 24 will then urge roller 20 into camming engagement with cam surface 16 to effect a locking action between races 10 and 12, thereby preventing further counterclockwise rotation of race 12.

In a similar fashion, passage 38 and communicating chamber 34 can be pressurized selectively to prevent relative rotation of inner race 12 in a clockwise direction as viewed in FIGURE 2. When the chamber 34 is vented, such clockwise rotation of race 12 is inhibited. The flow of fluid which takes place about the periphery of roller 22 during the time chamber 34 is pressurized is also carried by exhaust port 40 to the exhaust region.

Several types of automatic or semi-automatic controls may be used in a power transmission mechanism embodying the coupling structure of FIGURES 1 and 2 for the purpose of selectively controlling the distribution of pressure to passages 36 and 38, and to effect thereby an appropriate transmission speed ratio change.

Referring next to the embodiments of FIGURES 3 and 4, I have shown a coupling mechanism which is capable of establishing a one-way braking action as distinguished from the two-way braking action of the structure of FIGURES 1 and 2. The coupling of FIGURES 3 and 4 includes an outer race 110 and an inner race 112. A pair of side plates 128 and 130 is secured to the inner race 112 at either axial end thereof, and these plates extend radially outward in adjacent overlapping relationship with respect to the outer race 110.

The plates 128 and 130 cooperate with a plurality of recesses 114 formed in the outer race 110. The recesses 114 define cam surfaces 116 which cooperate with rollers 120, as indicated. The rollers 120 are capable of establishing a camming action between the outer cylindrical surface 126 of the inner race 12 and the cam surfaces 116. The rollers 120 are urged into camming engagement with the cooperating cam surfaces by means of springs 124. The springs 124 may be similar in form to the aforementioned springs 24. By preference, the springs 124 are convoluted leaf springs, as indicated.

The rollers 120 divide each of the recesses 114 into two separate chambers, one of which is occupied by the aforementioned spring 124. The other chamber is disposed on the righthand side of the rollers 120, as viewed in FIGURE 4, and it is identified by reference character 134. The passage 138 is formed in outer race 110, and it is in communication with chamber 134. Exhaust passages 140 are also formed in outer race 110, and they communicate with the chambers occupied by springs 124.

The axial ends of rollers 120 are disposed in sealing engagement with the side plates 130.

When passage 138 and the chamber 134 are pressurized, rollers 120 are urged out of camming engagement with the cooperating cam surfaces, and in this way overrunning motion of the inner race 12 in a clockwise direction with respect to outer race 110 will be permitted. Conversely, when passage 138 and chamber 134 are exhausted, springs 124 will urge the rollers into camming engagement with the cooperating cam surfaces to establish a one-way locking action between the coupling races.

During those instances in which the chamber 134 is pressurized, fluid flow takes place about the periphery of rollers 120, and this flow is distributed to an exhaust region through the exhaust passage 140.

If desired, the races 110 and 112 of the embodiments of FIGURES 3 and 4 can be journaled by independent bearing supports, and no other piloting action therebetween will be required. In other installations, however, it may be expedient to provide piloting action between the inner and outer races. This piloting action can be accomplished readily by means of bosses 150 formed on the outer race 110. The radially inward surfaces of bosses 150 may be made to cooperate with the outer cylindrical surface 126 of the inner race 112 for piloting purposes. The springs 124 are anchored on the bosses 150 as indicated.

The above described piloting feature may also be included in the embodiments of FIGURES 1 and 2 if the particular installation makes this desirable. The bosses 50 are formed on the outer race 10 in the embodiments of FIGURES 1 and 2, and they may be made to cooperate with the cylindrical surface 26 for piloting purposes.

Having thus described certain preferred embodiments of my invention, what I claim and desire to secure by United States Letters Patent is:

1. An overrunning coupling comprising concentric inner and outer races, one of said races being formed with a recess, a cylindrical roller disposed in said recess, said recess defining a cam surface, spring means for normally urging said roller into camming engagement with said cam surface and with the other race to inhibit relative rotation of said races in one direction, said roller cooperating with said recess to partly define a pressure chamber on one side of said roller and an exhaust chamber on the other side thereof, passage structure communicating with said pressure chamber for pressurizing the same whereby said roller may be selectively urged out of camming engagement with said cam surface to accommodate relative rotation of said races in said one direction, the pressurized fluid in said pressure chamber being allowed to flow past said roller into said exhaust chamber when the latter is out of camming engagement with said cam surface, and an exhaust port communicating with said exhaust chamber.

2. An overrunning coupling comprising concentric inner and outer races, one of said races being formed with a recess, a cylindrical roller disposed in said recess, said recess defining a cam surface, spring means for normally urging said roller into camming engagement with said cam surface and with the other race to inhibit relative rotation of said races in one direction, side plates secured to one of said races on either axial side thereof, said roller cooperating with said recess to define partly a pressure cavity, the axial ends of said rollers being situated in a plane normal to the axis of said rollers and the length of said rollers being substantially equal to the spacing between said plates whereby said plates cooperate with said roller ends to provide an effective fluid seal and to prevent dislocation of the rollers, passage structure communicating with said pressure chamber for pressurizing the same whereby said roller may be selectively urged out of camming engagement with said cam surface to accommodate relative rotation of said recesses in said one direction, and exhaust flow passage means situated on the other side of said roller for accommodating the discharge of fluid which passes around said rollers when the latter are urged out of camming engagement by fluid pressure.

3. An overrunning coupling comprising concentric inner and outer races, one of said races being formed with a recess, a cylindrical roller disposed in said recess, said recess defining a cam surface, spring means for normally urging said roller into camming engagement with said cam surface and with the other race to inhibit relative rotation of said races in one direction, side plates secured to one of said races on either axial side thereof, said plates and said recess cooperating to define a pressure chamber on one side of said roller, said spring means being located in said recess on the other side of said roller, passage structure communicating with said pressure chamber for pressurizing the same whereby said roller may be urged selectively out of camming engagement with said one cam surface to accommodate relative rotation of said races in said one direction, and an exhaust passage communicating with said recess to accommodate the flow of fluid passing around said roller when the latter is urged out of camming engagement with said cam surface under the influence of fluid pressure.

4. An overruning coupling mechanism comprising concentric inner and outer races, one of said races being formed with a recess, a cylindrical roller disposed in said recess, said recess defining a cam surface, spring means for normally urging said roller into camming engagement with said cam surface and with said other race to inhibit relative rotation of said races in one direction, side plates secured to said inner race on either axial side thereof, said side plates overlapping said outer race and cooperating therewith to define a closed pressure chamber on one side of said rollers, said spring means being located in said recess on the other side of said roller, and passage structure communicating with said pressure chamber for pressurizing the same whereby said roller may be selectively urged out of camming engagement with said cam surface to accommodate relative rotation of said races in one direction.

5. An overrunning coupling mechanism comprising concentric inner and outer races, one of said races being formed with a recess, a cylindrical roller disposed in said recess, said recess defining a cam surface, spring means comprising a leaf spring element of convoluted form for normally urging said roller into camming engagement with said cam surface and with said other race to inhibit relative rotation of said races in one direction, side plates secured to said inner race on either axial side thereof, side plates overlapping said outer race and cooperating therewith to define a closed pressure chamber on one side of said rollers, said spring means being located in said recess on the other side of said roller, passage structure communicating with said pressure chamber for pressurizing the same whereby said roller may be selectively urged out of camming engagement with said cam surface to accommodate relative rotation of said races in one direction, and an exhaust passage communicating with said recess in the vicinity of said spring means for accommodating the discharge of fluid passing said roller when said pressure chamber is pressurized.

6. An overrunning coupling mechanism comprising concentric inner and outer races, one of said races being formed with a recess, a pair of cylindrical rollers disposed in said recess, said recess defining a pair of cam surfaces, spring means situated between said rollers for normally urging each of said rollers into camming engagement with a separate one of said cam surfaces whereby relative rotation of said races in either direction is inhibited, each of said rollers cooperating with said recess to partly define a separate pressure cavity, and passage structure communicating with each pressure cavity for pressurizing the same whereby each roller may be selectively urged out of camming engagement with its cooperating cam surface to accommodate relative rotation of said races in either direction as desired.

7. An overrunning coupling mechanism comprising concentric inner and outer races, one of said races being formed with a recess, a pair of cylindrical rollers disposed in said recess, said recess defining a pair of cam surfaces, spring means situated between said rollers for normally urging each of said rollers into camming engagement with a separate one of said cam surfaces whereby relative rotation of said races in either direction is inhibited, each of said rollers cooperating with said recess to partly define a separate pressure cavity, passage structure communicating with each pressure cavity for pressurizing the same whereby each roller may be selectively urged out of camming engagement with its cooperating cam surface to accommodate relative rotation of said races in either direction as desired, and an exhaust passage communicating with said recess at a location between said rollers, said exhaust passage accommodating the flow of fluid past each of said rollers when the associated pressure chamber is pressurized.

8. A double acting overrunning coupling comprising concentric inner and outer races, one of said races being formed with recesses, a pair of clutch rollers disposed in each recess, said recess defining a pair of cam surfaces, one of said cam surfaces cooperating with a separate one of each of said rollers, spring means disposed between said rollers for normally urging said rollers into camming engagement with their respective cam surfaces thereby inhibiting relative rotation of said races in each direction, side plates secured to one of said races on either axial side thereof, said side plates and each of said recesses cooperating to define a pair of pressure cavities, one cavity being disposed on one side of each roller, and passage structure communicating with said pressure cavities for pressurizing the same whereby said rollers may be selectively urged out of camming engagement with their respective cam surfaces to accommodate relative rotation of said races in either direction as desired.

9. A double acting overrunning coupling comprising concentric inner and outer races, one of said races being formed with recesses, a pair of clutch rollers disposed in each recess, said recess defining a pair of cam surfaces, one of said cam surfaces cooperating with a separate one of each of said rollers, spring means disposed between said rollers for normally urging said rollers into camming engagement with their respective cam surfaces thereby inhibiting relative rotation of said races in each direction, side plates secured to one of said races on either axial side thereof, said side plates and each of said recesses cooperating to define a pair of pressure cavities, one cavity being disposed on one side of each roller, passage structure communicating with said pressure cavities for pressurizing the same whereby said rollers may be selectively urged out of camming engagement with their respective cam surfaces to accommodate relative rotation of said races in either direction as desired, and an exhaust passage communicating with said recess between said rollers for accommodating the distribution to the exhaust region of the fluid which passes said rollers when said pressure chambers are pressurized.

10. A double acting overrunning coupling mechanism comprising concentric inner and outer races, one of said races being formed with a plurality of recesses, a pair of cylindrical rollers disposed in each recess, each of said recesses defining a pair of cam surfaces, one roller of each pair being engageable with a separate one of said cam surfaces, spring means situated between said rollers for normally urging said rollers into camming engagement with said cam surfaces to inhibit relative rotation of said races in one direction, side plates secured to said inner race on either axial side thereof, said side plates extending radially outward in overlapping relationship with respect to said outer race and cooperating with said recesses to form a pair of closed pressure chambers, one pressure chamber being situated on one side of one roller and the other pressure chamber being situated on one side of the other roller, the axial ends of said rollers cooperating with said side plates to form a fluid seal and to prevent dislocation of said rollers during operation, and a separate passage communicating with each pressure chamber for accommodating the selective distribution of fluid pressure to said chambers whereby the release of said overrunning coupling may be controlled to permit relative rotation between said races in either direction as desired.

11. A double acting overrunning coupling mechanism comprising concentric inner and outer races, one of said races being formed with a plurality of recesses, a pair of cylindrical rollers disposed in each recess, each of said recesses defining a pair of cam surfaces, one roller of each pair being engageable with a separate one of said cam surfaces, spring means situated between said rollers for normally urging said rollers into camming engagement with said cam surfaces to inhibit relative rotation of said races in one direction, side plates secured to said inner race on either axial side thereof, said side plates extending radially outward in overlapping relationship with respect to said outer race and cooperating with said recesses to form a pair of closed pressure chambers, one pressure chamber being situated on one side of one roller and the other pressure chamber being situated on one side of the other roller, the axial ends of said rollers cooperating with said side plates to form a fluid seal and to prevent dislocation of said rollers during operation, a separate passage communicating with each pressure chamber for accommodating the selective distribution of fluid pressure to said chambers whereby the release of said overrunning coupling may be controlled to permit relative rotation between said races in either direction as desired, and an exhaust flow path communicating with each each recess at a region between the associated rollers, said exhaust passage accommodating the flow of fluid which passes each of said rollers when the associated pressure chamber is pressurized.

References Cited in the file of this patent

UNITED STATES PATENTS

| | | |
|---|---|---|
| 1,807,035 | Herman | May 26, 1931 |
| 2,001,668 | Maier | May 14, 1935 |

FOREIGN PATENTS

| | | |
|---|---|---|
| 1,061,396 | France | Nov. 25, 1953 |